Oct. 26, 1937.   M. A. PIXLEY ET AL   2,096,857
METER CASING
Filed May 27, 1935   2 Sheets-Sheet 1
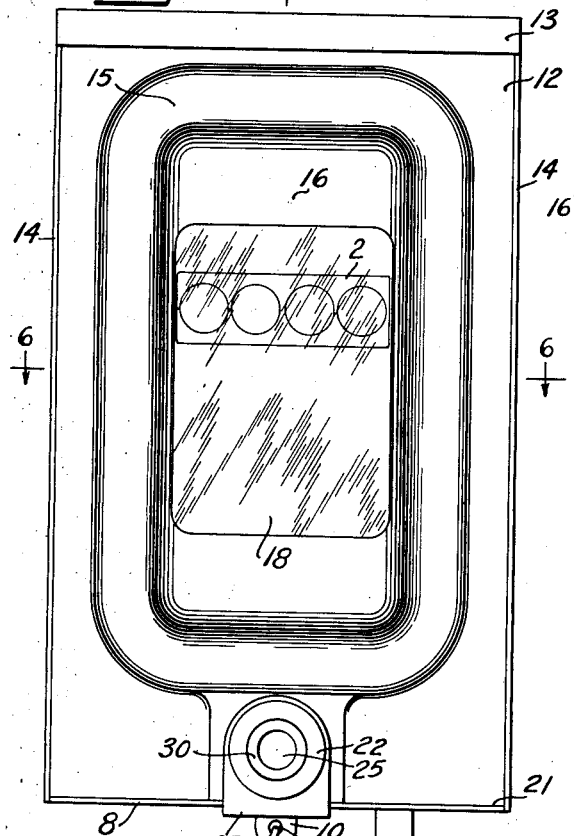
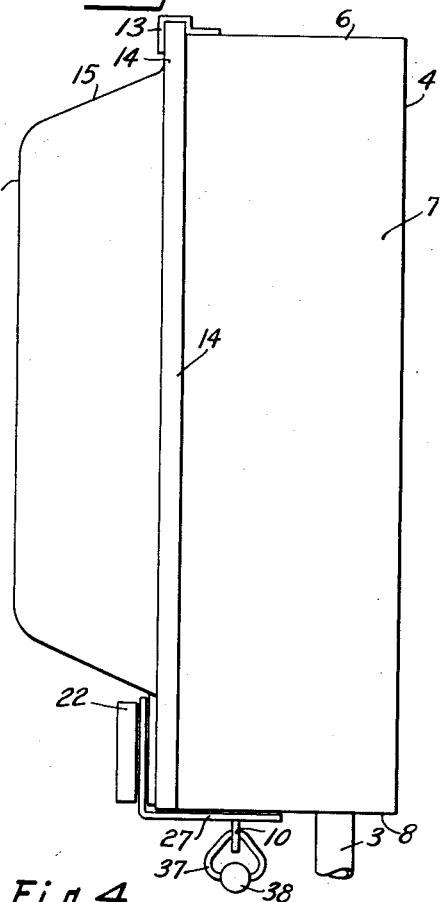
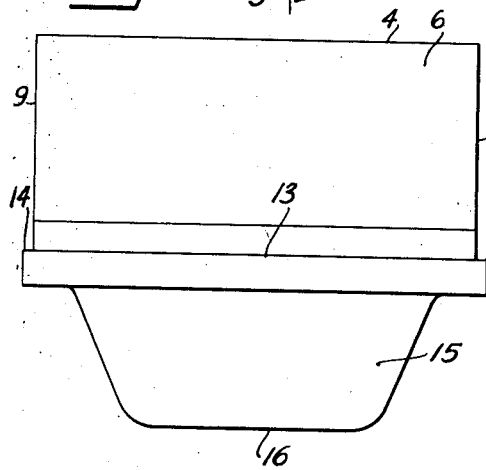
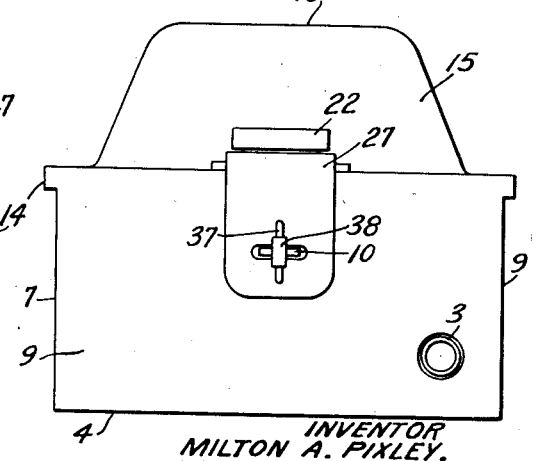
INVENTOR
MILTON A. PIXLEY.
EDWARD H. McCLOUD.
BY
ATTORNEYS

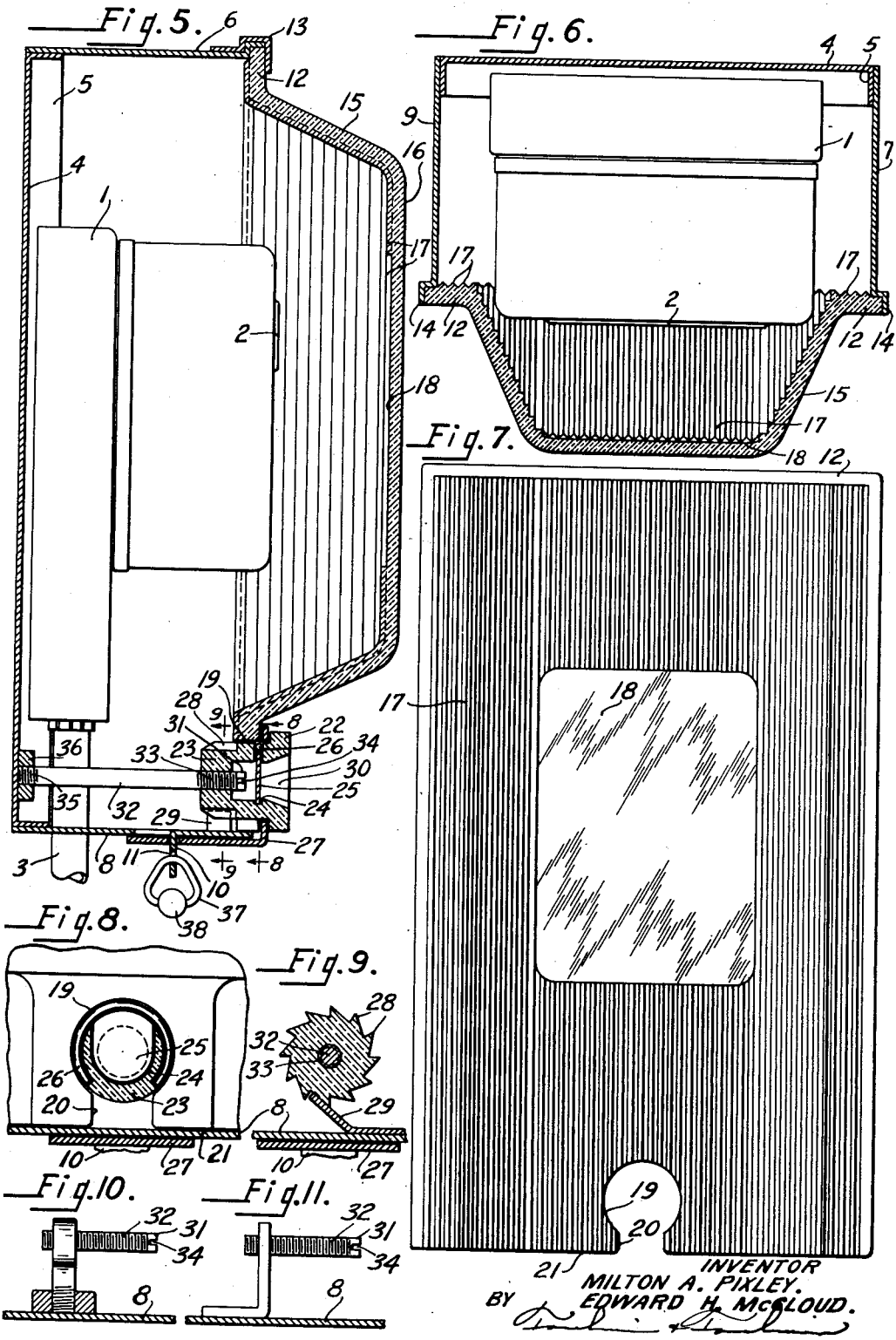

Patented Oct. 26, 1937

2,096,857

UNITED STATES PATENT OFFICE 2,096,857

METER CASING

Milton A. Pixley and Edward H. McCloud,
Columbus, Ohio

Application May 27, 1935, Serial No. 23,620

1 Claim. (Cl. 247—2)

This invention relates to meter casings.

It is the object of the invention to provide a casing for an electric meter, particularly an electric meter for the measuring of current supplied to various types of establishments where it is desirable to have the usual metal and glass meter casing enclosed by a supplementary protective casing to prevent the meter being tampered with.

It is the particular object of the invention to provide a metal back and side walls of the supplementary casing and a glass cover comprising the front of the casing, which cover is struck-up to form a spaced, partially transparent and partially translucent cover so that the dials of the meter may be read through the front of the glass cover of the casing, while the glass is so remote from the front of the meter that it is substantially impossible for one who desires to drill the glass and tamper with the meter to accomplish such an object.

One of the problems in the protection of meters is to prevent the meter being tampered with by the penetration of the glass. This is effected by a drill and a lubricant or cutting agent for the glass. By having the glass cover of the supplementary casing arranged so that it is remote from the glass face of the inner casing of the meter, it is impossible to apply the lubricant or cutting agent to the surface of the inner glass on the inner meter casing.

It is a further object to provide such a glass cover partially transparent and partially translucent so that adequate light is admitted to the interior of the supplementary casing to permit of the reading of the meter, but the translucent portion of the glass cover makes it more difficult for anyone desiring to tamper with the meter to observe the meter and its parts and determine how to tamper with them.

It is a further object of this invention to provide a ribbed glass cover with the ribs on the interior of the glass to give the translucent effect and to strengthen the glass, while at the same time providing a limited area without ribs which is transparent.

It is a particular object to provide such a glass cover that can be inserted within the metal flange of the supplementary casing.

It is an additional object to provide a locking device of such character that when it is once locked and covered with a breakable cover, the lock can not be tampered with for the opening of the casing without the breaking of the cover, and when once broken, it can not be restored, so that any tampering with the case can be detected.

Referring to the drawings, Figure 1 is a front elevation of the supplementary casing.

Figure 2 is a side elevation thereof.

Figure 3 is a top plan view thereof.

Figure 4 is a bottom plan view thereof.

Figure 5 is a section on the line 5—5 of Figure 1.

Figure 6 is a section on the line 6—6 of Figure 1.

Figure 7 is an inside elevation of the glass cover of the supplementary casing.

Figure 8 is a section on the line 8—8 of Figure 5 looking in the direction of the arrows showing the detailed arrangement of the lock.

Figure 9 is a section on the line 9—9 of Figure 5 looking in the direction of the arrows.

Figure 10 is a modified form of supporting the inner end of the attaching bolt 32.

Figure 11 is another modified form of supporting the inner end of the attaching bolt 32.

Referring to the drawings in detail, I designates a meter casing which is provided with a glass window 2. The cables supplying the meter enter the meter through the conduit 3. This meter casing is enclosed within a casing consisting of a metal back 4 having a flange 5 on which is mounted a rectangular side wall structure consisting of the sheets 6, 7, 8, and 9. The bottom wall 8 is punched to form a depending hasp 10 having a slot 11.

The front of the casing is provided with a glass body having a flange 12 at the top and sides which engages within the metal flanges 13 and 14 on the top and sides of the casing.

This glass flange 12 is continued into an extended diagonal portion 15 and a front portion 16. The interior of the glass is formed in a plurality of ribs 17 except in the area 18 which is left clear as an observation window.

The bottom of the glass front is provided with an aperture 19 and a restricted throat 20 forming a slot connecting the aperture 19 and the bottom edge 21 of the glass front. Mounted in this slot is a locking plug consisting of a head 22 and a body 23 having an arcuate slot 24 for receiving a glass window 25 and a retaining ring 26. The head 22 forms a shoulder for retaining the locking plate 27 between the plug and the glass wall of the front. The inner exterior end of the plug is formed with ratchet teeth 28 that are engaged by a dog or retaining finger 29 mounted on the wall 8 forming the bottom of the casing. This plug is provided with a recess 30 which is closed off by the glass plate 25 to cover the head 31 of the retaining rod 32. This rod 32 is threaded at 33 into the rear end of the plug. It is slotted to receive a screw driver as at 34. The rear end of the plug is threaded at 35 within the retaining nut 36 that is welded to the rear wall 4 of the casing.

The plug locking plate 27 is slotted to receive the depending finger 10. It is retained in position by the strap 37 and lead seal 38 which are associated with the slot 11 in the finger 10.

*Assembly of the lock*

When the glass cover has been put into position, and the rod 32 has been screwed into the lug 36, the plug is inserted through the plate 27 with its window 25 and retaining ring 26 in position and rotated so that it is threaded upon the thread 33 of the rod 32 until the several parts are clamped together. The strap 37 and lead seal 38 are then applied. The glass cover is held in position because its flange 12 is within the flanges 13 and 14 of the metal casing.

*Unlocking of the casing*

When it is desired to unlock the casing, the window 25 has to be broken. Then a screw driver is inserted in the slot 34 and the rod 32 rotated until it is detached from the nut or lug 36. The locking nut can therefore be removed. Then the strap 37 is separated and the parts are disassembled.

In practice, it has been found that those who tamper with meters employ a drill and a cutting agent or lubricant for the drill so as to be able to penetrate the glass tube. If this same operation is attempted to be performed on the glass cover of the supplementary casing, the cover being remote from the face 2, it is impossible for the person using the drill to apply the lubricant or cutting compound to the surface 2 and also apply the drill. Due to the restricted area of vision, it would only be an expert who would know enough about the meter to determine how to tamper with it due to the opening 18 confining the view of the meter to a portion of its face. By having the extended glass front, sufficient light is diffused into the interior of the supplementary casing to permit of easy reading of the meter.

It will be understood that it is desired to comprehend within this invention such modifications as may be necessary to adapt it to varying conditions and uses.

Having thus fully described my invention, what I claim as new and desire to secure by Letters Patent, is:

In combination, a meter casing having a dial front window, a protective metal casing surrounding said meter casing, the forward edges of the side walls of the protective casing being substantially in alignment with the forward face of the meter casing so as to substantially enclose the latter, and a forwardly projecting diffusing and light-directing glass cover secured to the forward edges of the metal protective casing and composed of forwardly inclined side walls and a flat front face spaced a substantial distance from the forward face of the meter casing, said flat front face being provided with a transparent glass window of limited size located directly in front of the dial window of the meter casing, whereby light is concentrated on the front face of the meter casing by said glass cover to sufficiently illuminate said face whilst all other parts of the meter casing remain substantially without illumination and are protected from accidental injury by the surrounding metal casing.

MILTON A. PIXLEY.
EDWARD H. McCLOUD.